(12) United States Patent
Kubo et al.

(10) Patent No.: US 10,506,132 B2
(45) Date of Patent: Dec. 10, 2019

(54) COLOR CONVERSION APPARATUS, IMAGE FORMING APPARATUS, AND NON-TRANSITORY COMPUTER READABLE MEDIUM

(71) Applicant: FUJI XEROX CO., LTD., Tokyo (JP)

(72) Inventors: Masahiko Kubo, Kanagawa (JP); Kaoru Yamauchi, Kanagawa (JP); Ayako Watanabe, Kanagawa (JP); Yosuke Tashiro, Kanagawa (JP); Kaori Iwaki, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/890,813

(22) Filed: Feb. 7, 2018

(65) Prior Publication Data

US 2018/0367702 A1 Dec. 20, 2018

(30) Foreign Application Priority Data

Jun. 15, 2017 (JP) .................................. 2017-117523

(51) Int. Cl.
*G06F 3/12* (2006.01)
*H04N 1/60* (2006.01)
*G03G 15/00* (2006.01)
*G03G 9/09* (2006.01)
*H04N 1/54* (2006.01)

(52) U.S. Cl.
CPC ............ *H04N 1/60* (2013.01); *G03G 9/0902* (2013.01); *G03G 9/0926* (2013.01); *G03G 15/5062* (2013.01); *G03G 15/6585* (2013.01); *H04N 1/54* (2013.01); *G06F 3/1205* (2013.01); *G06F 3/1253* (2013.01); *H04N 1/6088* (2013.01)

(58) Field of Classification Search
CPC .......... H04N 1/54; H04N 1/60; H04N 1/6008; H04N 1/6088; G03G 9/0902; G03G 9/0926; G03G 15/5062; G06F 3/205; G06F 3/1253
USPC ............................................ 358/1–1.18, 1.9
See application file for complete search history.

(56) References Cited

U.S. PATENT DOCUMENTS

| 8,711,432 B2 | 4/2014 | Ito | |
|---|---|---|---|
| 2010/0134550 A1* | 6/2010 | Ito | B41J 2/2056 347/15 |
| 2010/0177357 A1* | 7/2010 | Yoshida | B41J 2/2114 358/3.21 |
| 2013/0208035 A1* | 8/2013 | Okumura | B41J 2/195 347/7 |
| 2014/0350867 A1* | 11/2014 | Alspach | G01J 3/46 702/28 |

FOREIGN PATENT DOCUMENTS

| JP | 5909887 B2 | 4/2016 |
|---|---|---|
| JP | 5920580 B2 | 5/2016 |

* cited by examiner

*Primary Examiner* — Gabriel I Garcia
(74) *Attorney, Agent, or Firm* — Sughrue Mion, PLLC

(57) ABSTRACT

A color conversion apparatus includes an accepting unit and a converter. The accepting unit accepts plural colorimetric values obtained by measuring a target color image in plural directions. The converter converts the plural colorimetric values accepted by the accepting unit to color values including a value indicating a coloring-material amount of a luster coloring material and a value indicating a coloring-material amount of a coloring material other than the luster coloring material.

18 Claims, 15 Drawing Sheets

FIG. 9

WEIGHTED AVERAGE ΔE(WAVG) OF COLOR DIFFERENCES
= {w1 × (COLOR DIFFERENCE BETWEEN L*a*b*(15°) AND f(C, M, Y, K=0, Si, 15°))
+ w2 × (COLOR DIFFERENCE BETWEEN L*a*b*(45°) AND f(C, M, Y, K=0, Si, 45°))
+ w3 × (COLOR DIFFERENCE BETWEEN L*a*b*(110°) AND f(C, M, Y, K=0, Si, 110°))}/(w1 + w2 + w3)

w1: WEIGHTED COEFFICIENT IN REGULAR REFLECTION DIRECTION (15°)
w2: WEIGHTED COEFFICIENT IN FRONT DIRECTION (45°)
w3: WEIGHTED COEFFICIENT IN DIFFUSED-LIGHT DIRECTION (110°)

CALCULATE C, M, AND Y VALUES WITH WHICH WEIGHTED AVERAGE ΔE(WAVG)
OF COLOR DIFFERENCES IS MINIMIZED.

COLOR CONVERSION APPARATUS, IMAGE FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-117523 filed Jun. 15, 2017.

BACKGROUND (i) Technical Field

The present invention relates to a color conversion apparatus, an image forming apparatus, and a non-transitory computer readable medium.

(ii) Related Art

An electrophotographic image forming apparatus forms a color image on a recording medium, such as a print sheet, by using coloring materials of several colors called basic colors, such as cyan (C), magenta (M), and yellow (Y) toners. Further, for a frequently used black color, a black (K) toner is often used.

Currently, color representation may be extended by using a coloring material of a special color in addition to coloring materials of C, M, Y, and K colors, which are usually used. For example, a coloring material of a metallic color (metallic gloss color), such as a gold toner or a silver toner, or a luster coloring material, such as a pearly coloring material or a mica coloring material, is used to enable forming of a glossy color image.

SUMMARY

According to an aspect of the invention, there is provided a color conversion apparatus including an accepting unit and a converter. The accepting unit accepts plural colorimetric values obtained by measuring a target color image in plural directions. The converter converts the plural colorimetric values accepted by the accepting unit to color values including a value indicating a coloring-material amount of a luster coloring material and a value indicating a coloring-material amount of a coloring material other than the luster coloring material.

BRIEF DESCRIPTION OF THE DRAWINGS

An exemplary embodiment of the present invention will be described in detail based on the following figures, wherein:

FIG. 9 is a diagram for describing an objective function that is used in color conversion by a conversion unit;

DETAILED DESCRIPTION

Hereinafter, an exemplary embodiment of the present invention will be described in detail with reference to the drawings.

Figure 1:
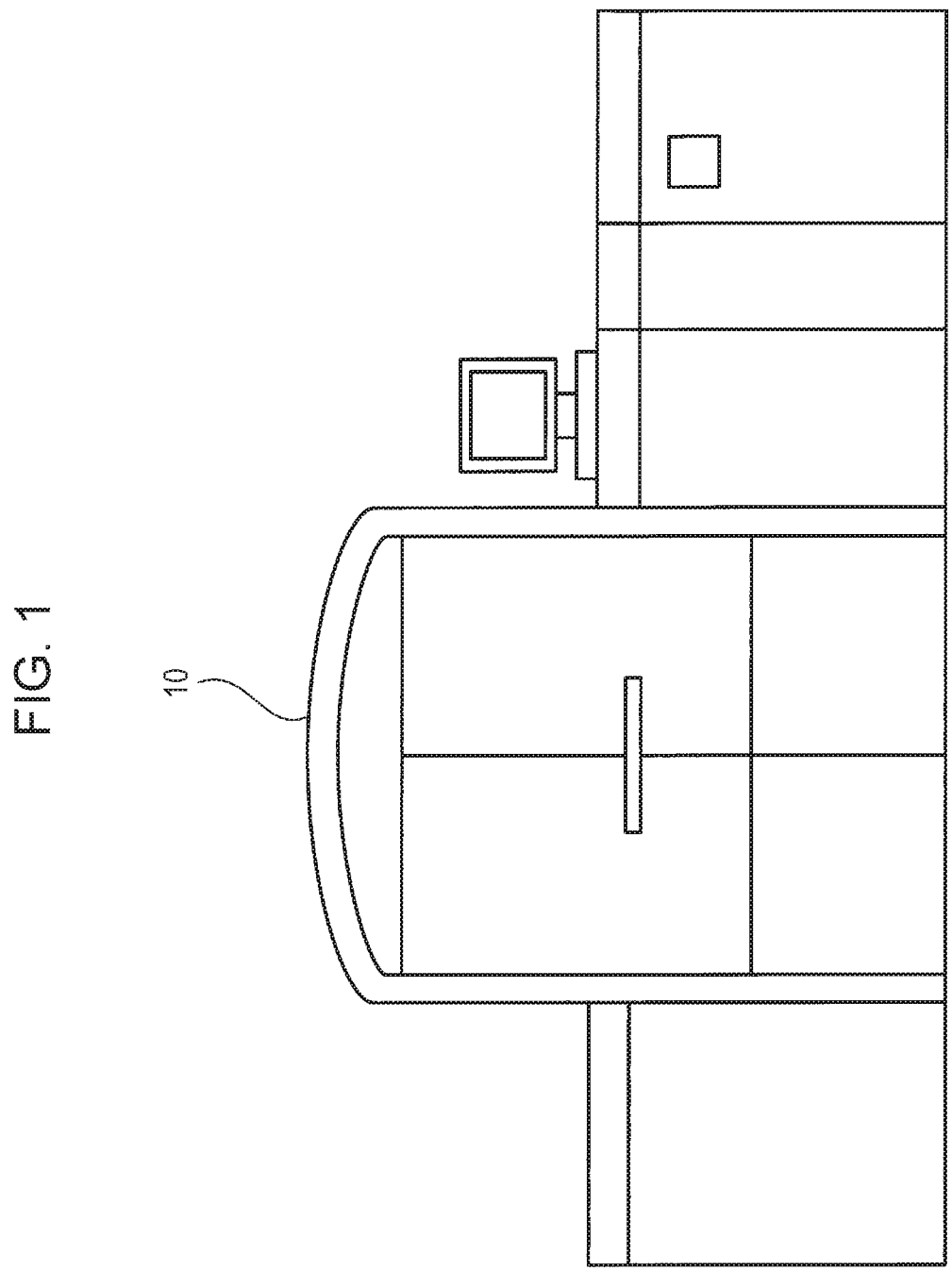
FIG. 1 is an external view of an image forming apparatus according to an exemplary embodiment of the present invention.

FIG. 1 is an external view of an image forming apparatus 10 according to an exemplary embodiment of the present invention.

The image forming apparatus 10 according to this exemplary embodiment is, as illustrated in FIG. 1, a production printer that is used in commercial printing, and has functions that enable a high-speed printing process of high image quality.

Figure 2:
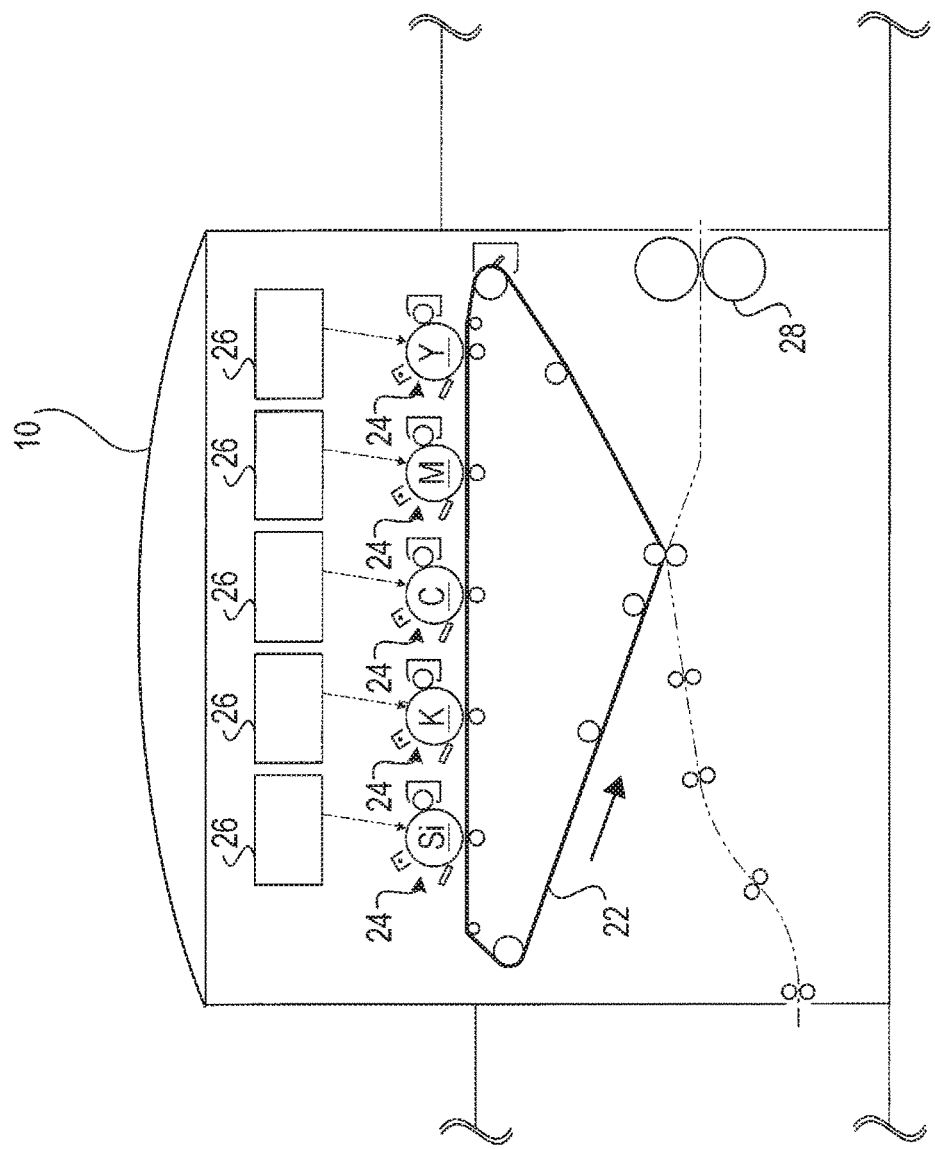
FIG. 2 is a diagram for describing a structure inside a system unit of the image forming apparatus.

The structure inside the system unit of the image forming apparatus 10 is described with reference to FIG. 2. As illustrated in FIG. 2, the image forming apparatus 10 has five image forming units 24. The five image forming units 24 are configured to form images using toners of yellow (Y), magenta (M), cyan (c), black (K), and a special color, respectively.

As the toner of a special color, a silver toner (Si), a gold toner (G), a clear toner, a white toner, and so on are available. It is allowed to select and use one toner from among these special-color toners. FIG. 2 illustrates a state where a silver toner (Si) is selected and set from among the special-color toners.

Note that, in this exemplary embodiment, a case is described where an image is formed by using a metallic (metallic gloss color) toner, such as a silver toner or a gold toner, and where the amounts of toners of respective colors, for example, C, M, Y, K, and Si, are determined. In the description given below, a case where a silver toner is used to form an image is described.

The image forming units 24 each include a photoconductor drum, a charging device that uniformly charges the surface of the photoconductor drum, a developing device that develops an electrostatic latent image formed on the photoconductor drum, and so on. On the photoconductor drums of the image forming units 24, electrostatic latent images are formed by light scanning devices 26 emitting laser beams. The electrostatic latent images are developed by using toners of respective colors, and images are formed.

The images of respective colors formed by the image forming units 24 are transferred to an intermediate transfer belt 22, and thereafter, further transferred to a conveyed print sheet. The toner image transferred to the print sheet is fixed on the print sheet by a fuser 28 applying heat and pressure.

Figure 3:
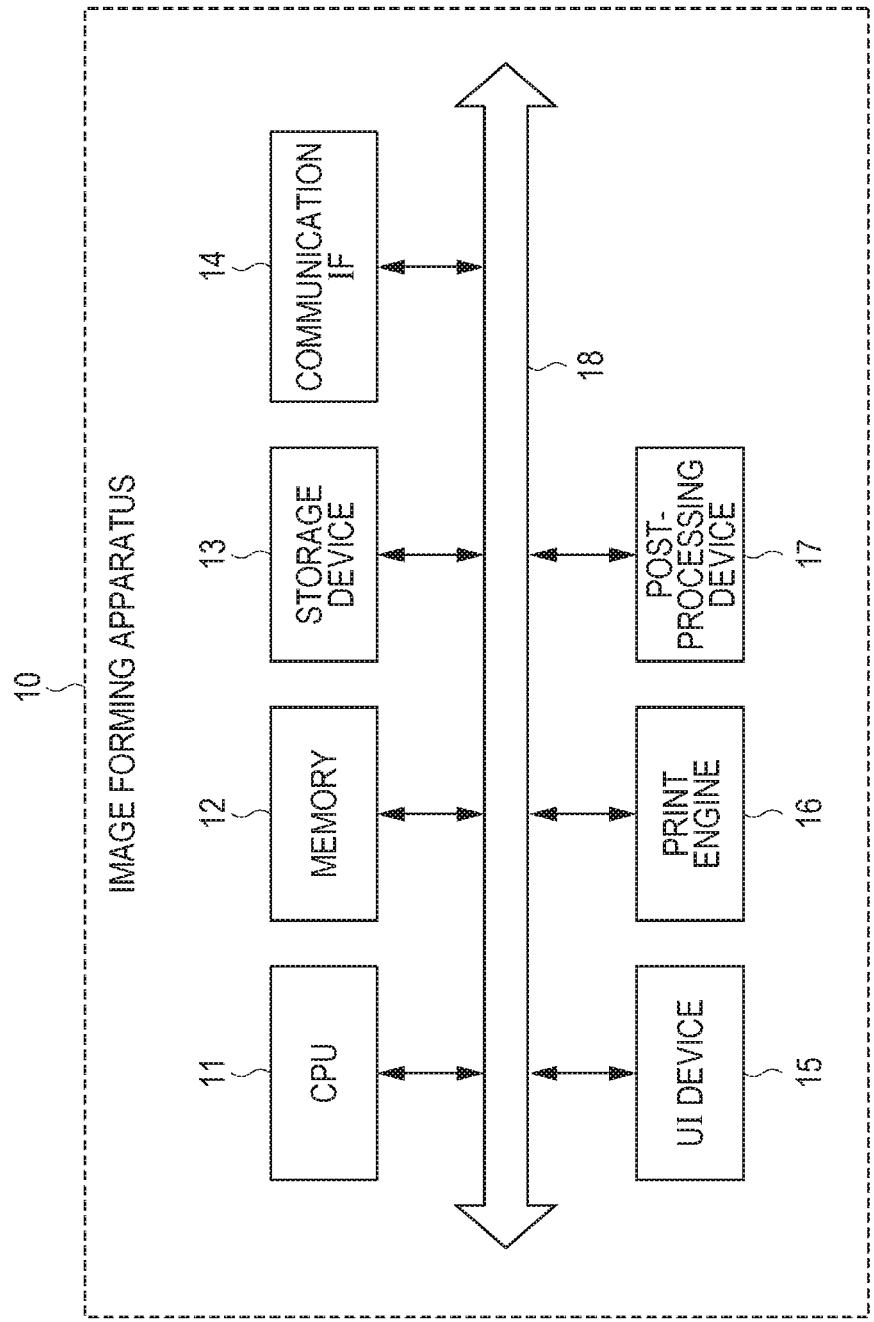
FIG. 3 is a block diagram illustrating a hardware configuration of the image forming apparatus according to an exemplary embodiment of the present invention.

The hardware configuration of the image forming apparatus 10 according to this exemplary embodiment is illustrated in FIG. 3.

As illustrated in FIG. 3, the image forming apparatus 10 includes a central processing unit (CPU) 11, a memory 12, a storage device 13, which is, for example, a hard disk drive (HDD), a communication interface (IF) 14 used to transmit/receive data to/from an external apparatus and so on via a network, a user interface (UI) device 15, which includes a touch panel, or a liquid crystal display and a keyboard, a print engine 16, and a post-processing device 17. These constituent elements are connected to one another via a control bus 18.

The print engine 16 performs processes of charging, exposure, development, transfer, fixing, and so on to print an image on a recording medium, such as a print sheet. The post-processing device 17 performs various post-processes, such as a stapling process, a punching process, and a folding process, for a sheet that has been subjected to a print process by the print engine 16.

The CPU 11 performs a predetermined process on the basis of a control program stored in the memory 12 or the storage device 13 to control operations of the image forming apparatus 10. In this exemplary embodiment, it is assumed that the CPU 11 reads and executes the control program stored in the memory 12 or the storage device 13 as described above; however, the control program may be stored in a storage medium, such as a compact disc read-only memory (CD-ROM) and provided to the CPU 11.

Figure 4:
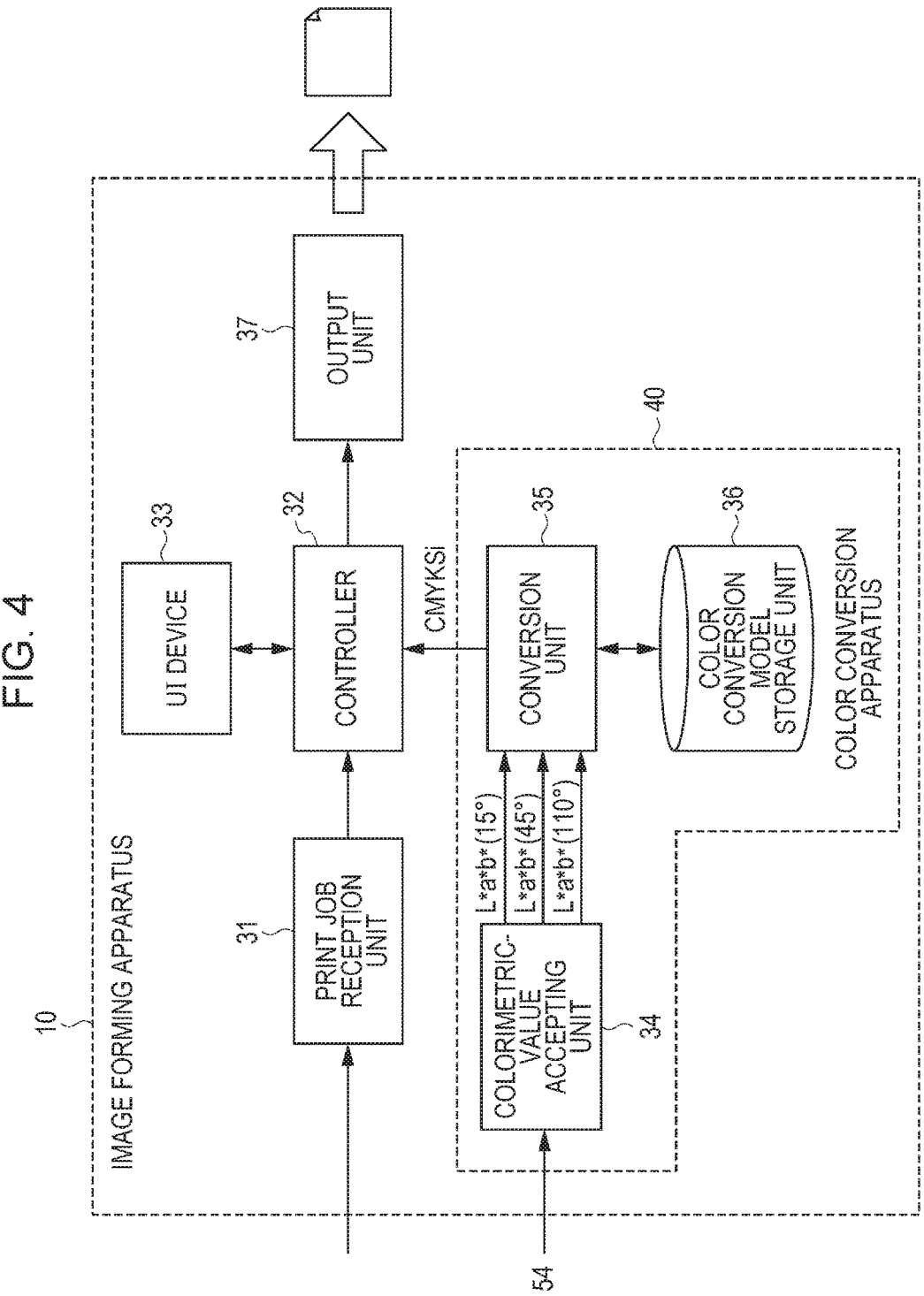
FIG. 4 is a block diagram illustrating a functional configuration of the image forming apparatus according to an exemplary embodiment of the present invention.

FIG. 4 is a block diagram illustrating a functional configuration of the image forming apparatus 10 implemented by executing the above-described control program.

As illustrated in FIG. 4, the image forming apparatus 10 according to this exemplary embodiment includes a print job reception unit 31, a controller 32, a UI device 33, a colorimetric-value accepting unit 34, a conversion unit 35, a color conversion model (printer model) storage unit 36, and an output unit 37. The colorimetric-value accepting unit 34, the conversion unit 35, and the color conversion model storage unit 36 constitute a color conversion apparatus 40.

The print job reception unit 31 receives a print instruction from, for example, an external terminal apparatus via a network.

The controller 32 controls the output unit 37 on the basis of a print jot received by the print job reception unit 31 to thereby perform a print process.

The UI device 33 is a device for receiving an operation by a user and displaying various types of information to a user.

Here, in a case where a spot color is specified for an image in a print job received by the print job reception unit 31, the controller 32 determines the amount of a toner of the specified spot color in accordance with an instruction from the color conversion apparatus 40.

The color conversion apparatus 40 receives from a colorimeter 54 colorimetric values obtained by performing a color measurement of a color sample image of the spot color in order to determine in advance the amount of a toner of the spot color, converts the colorimetric values to C, M, Y, K, and Si values including a value for a silver toner (Si toner), and outputs the resulting values to the controller 32. The colorimetric-value accepting unit 34, the conversion unit 35, and the color conversion model storage unit 36, which constitute the color conversion apparatus 40, are described below.

The colorimetric-value accepting unit 34 accepts plural colorimetric values obtained by measuring a target color image that is a color sample of the spot color in plural directions. Specifically, a target color image is illuminated with light in a diagonal direction as illustrated in FIG. 5, and the colorimetric-value accepting unit 34 accepts colorimetric values of the target color image measured in a front direction (45°), which is a direction normal to the target color image, colorimetric values of the target color image measured in a regular reflection direction (15°) relative to the illumination light, and colorimetric values of the target color image measured in a diffused-light direction (110°) on a side close to the entry direction of the illumination light relative to the front direction (45°).

Figure 5:
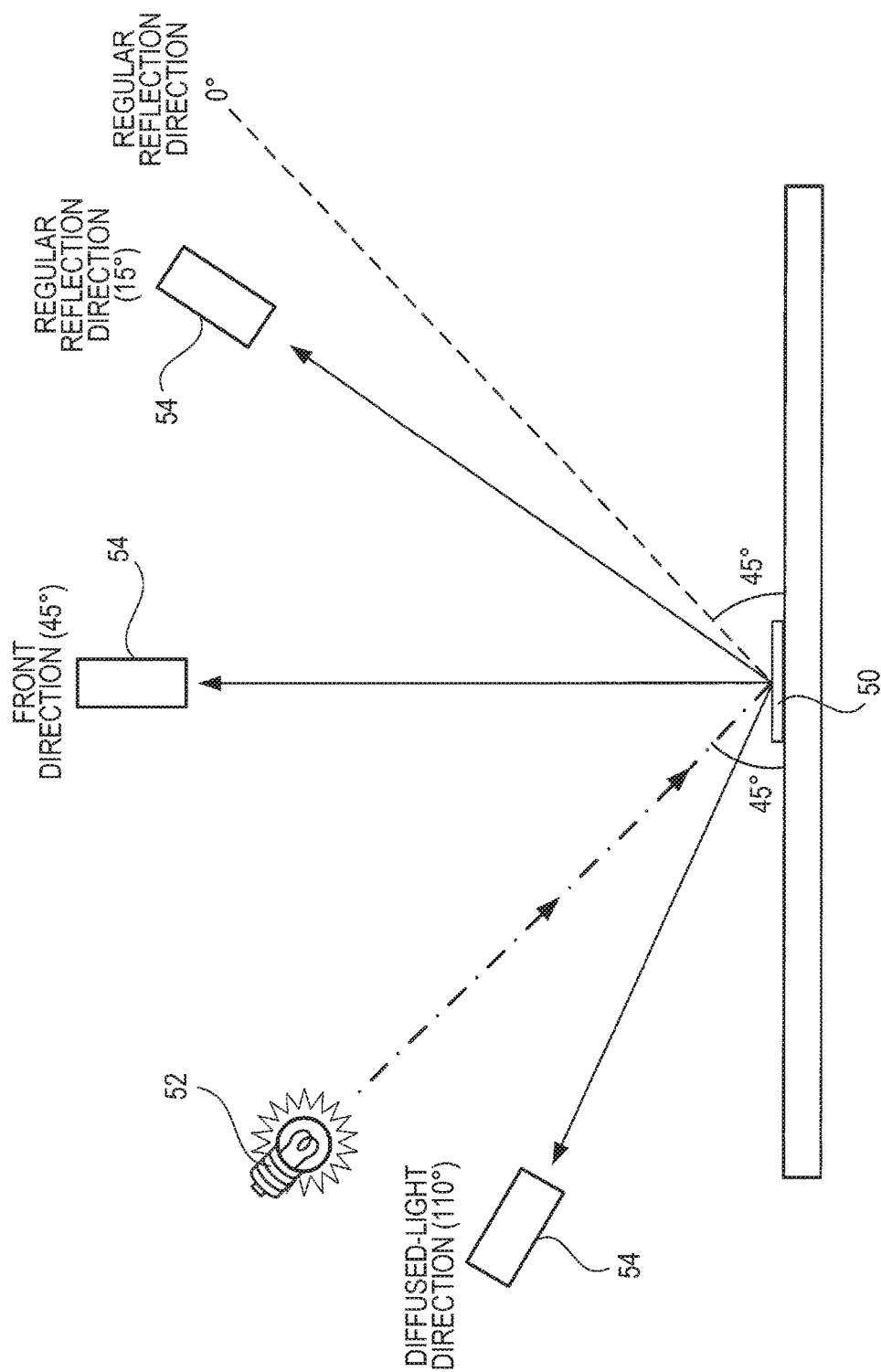
FIG. 5 is a diagram illustrating a case where a color measurement of a measurement target image is performed in color measurement directions at three angles (15°, 45°, and) 110°.

FIG. 5 is a diagram illustrating a case where a color measurement of a measurement target image 50 is performed in color measurement directions at three angles (15°, 45°, and) 110°, and illustrates a state where illumination light from a light source 52 is emitted to the measurement target image 50 in a diagonal direction at 45° and, when the regular reflection direction is assumed to correspond to 0° (reference direction), a color measurement is performed by the colorimeter 54 in directions at 15°, 45°, and 110°.

In FIG. 5, the direction at 45° is the front direction of (the direction normal to) the measurement target image 50. The direction at 15° is a regular reflection direction in which regular reflection light from the measurement target image 50 is measured. The regular reflection direction in which a color measurement of regular reflection light is performed is not set to the direction at 0° and is shifted by 15°. This is because, if a color measurement is performed in the direction at 0°, regular reflection light directly enters the colorimeter 54, and the color tone of the measurement target is unable to be measured.

In FIG. 5, the direction at 110° is set as a diffused-light direction in which diffused light from the measurement target image 50 is measured.

In a case of a color measurement of an ordinary image other than an image, such as a color sample of a metallic color, for which the color tone changes depending on the direction in which the image is viewed, the color measurement is performed in only the front direction (45°). In this exemplary embodiment, a color measurement is performed also in the regular reflection direction (15°) and the diffused-light direction (110°) in addition to the front direction (45°) to obtain colorimetric values, which is a difference from an ordinary color measurement method.

It is possible to employ a configuration in which color values including the toner amount of a silver toner are calculated by using colorimetric values obtained in at least two directions, for example, the front direction (45°) and the regular reflection direction (15°).

The conversion unit 35 converts plural colorimetric values accepted by the colorimetric-value accepting unit 34 to color values (C, M, Y, K, and Si), which include a value Si indicating the toner amount of a silver toner, which is a luster coloring material, and values C, M, Y, and K indicating the toner amounts of toners other than the silver toner.

Figure 6:
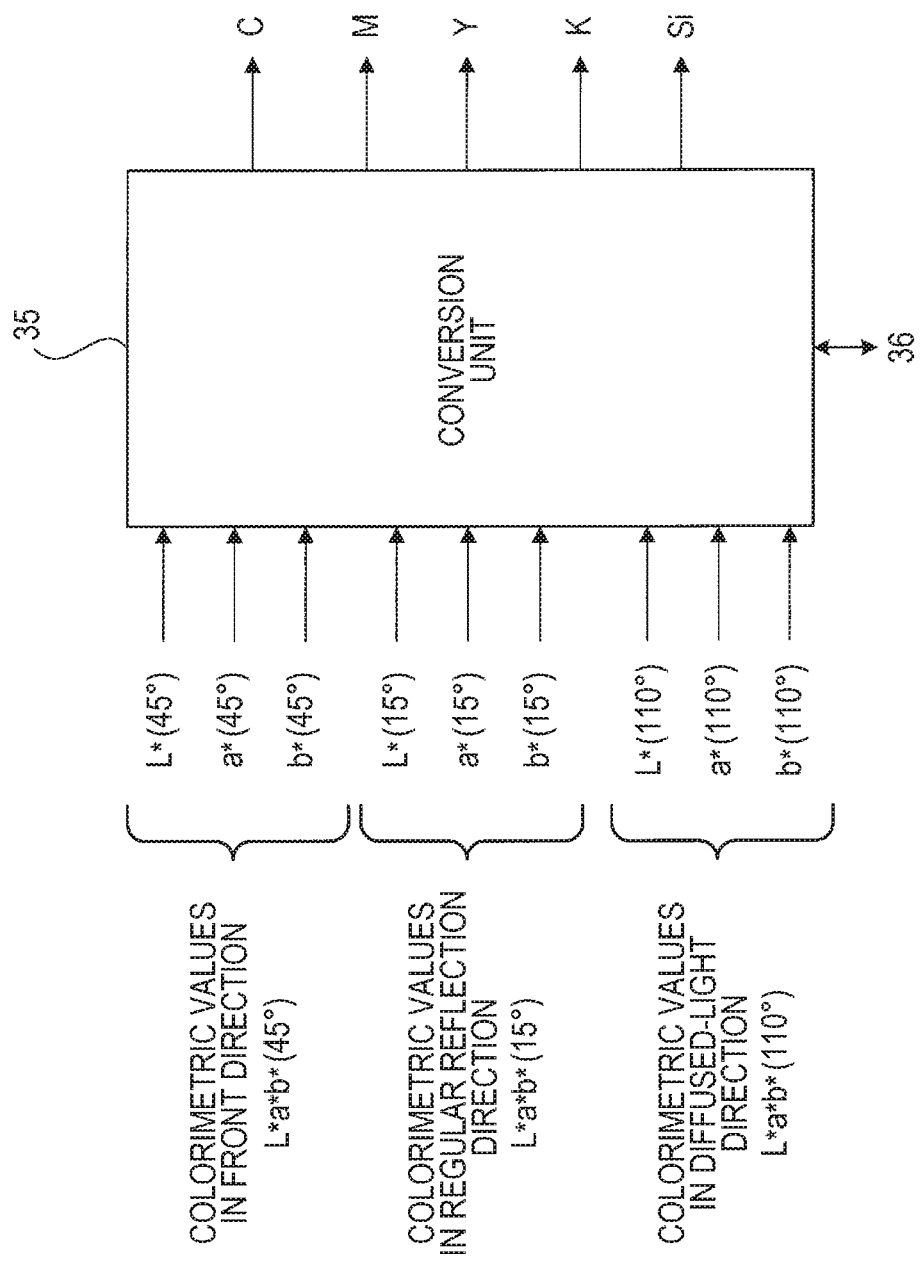
FIG. 6 is a diagram illustrating a case where colorimetric values in color measurement directions at three angles are converted to values (C, M, Y, K, and Si) that indicate the amounts of toners of respective colors.

FIG. 6 illustrates a state where the conversion unit 35 converts colorimetric values obtained in color measurement directions at three angles to values (C, M, Y, K, and Si) indicating the toner amounts of the respective colors.

In this exemplary embodiment, a description is given while using a case where colorimetric values are output from the colorimeter 54 as signals represented in accordance with the L*a*b* color system. Therefore, in a description given below, colorimetric values obtained in the front direction (45°) are expressed by L*a*b*(45°), colorimetric values obtained in the regular reflection direction (15°) are expressed by L*a*b*(15°), and colorimetric values obtained in the diffused-light direction (110°) are expressed by L*a*b*(110°).

As illustrated in FIG. 6, the conversion unit 35 receives colorimetric values (L*(45°), a*(45°), and b*(45°)) obtained in the front direction, colorimetric values) (L*(15°), a*(15°), and b*(15°)) obtained in the regular reflection direction, and colorimetric values (L*(110°), a*(110°), and b*(110°)) obtained in the diffused-light direction, uses a color conversion model stored in the color conversion model storage unit 36, and outputs C, M, Y, K, and Si values. The details of the conversion unit 35 performing a process for conversion from received colorimetric values to C, M, Y, K, and Si values using the color conversion model will be described below.

As described above, in the case where a spot color is specified in a print job received by the print job reception unit 31, the controller 32 controls the output unit 37 to output an image on the basis of the color values (C, M, Y, K, and Si) obtained as a result of conversion by the conversion unit 35 in the color conversion apparatus 40.

The color conversion model storage unit 36 stores a color conversion model in which combinations of color measurement directions and the coloring-material amounts of coloring materials of respective colors are associated with color values actually measured.

Figure 7:
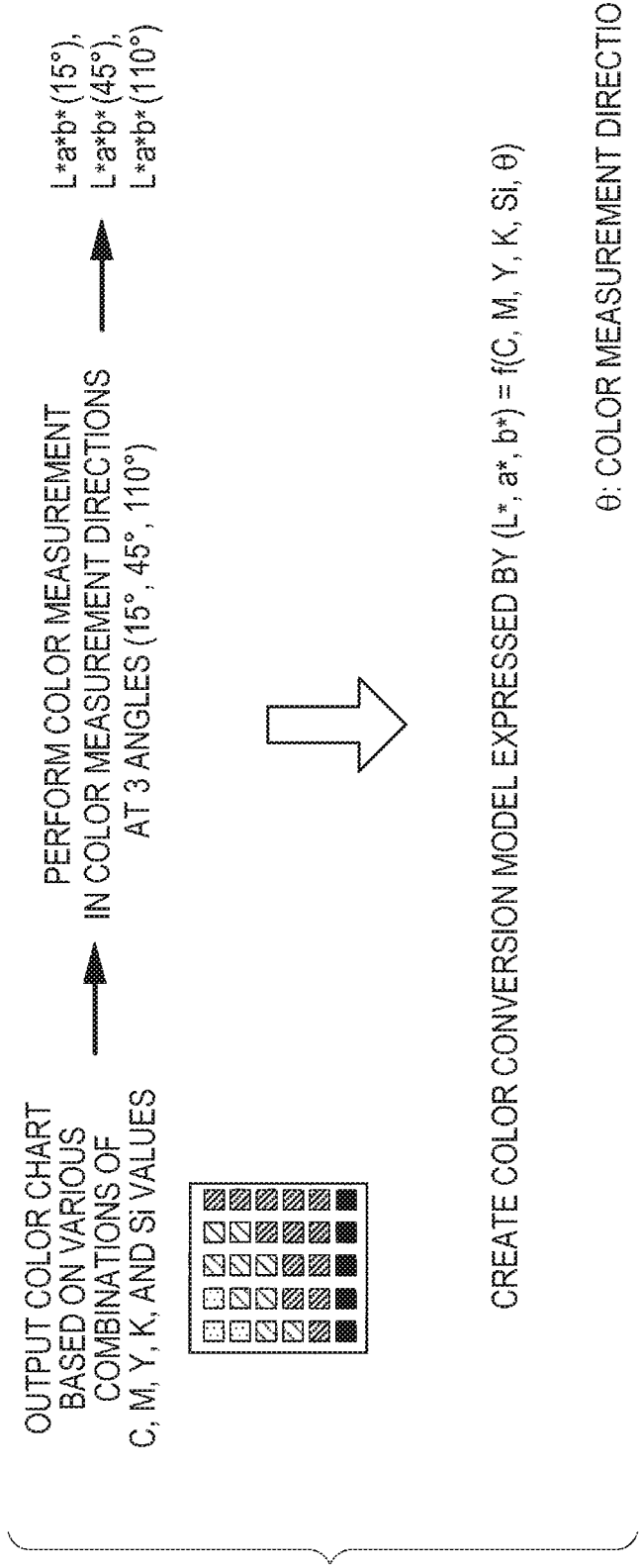
FIG. 7 is a diagram for describing a method for creating a color conversion model that is stored in a color conversion model storage unit.

A method for creating the color conversion model in the color conversion model storage unit 36 is described with reference to FIG. 7.

First, a color chart (color patches) based on various combinations of C, M, Y, K, and Si values is output. Then, a color measurement of each color patch is performed in color measurement directions at three angles (15°, 45°, and 110°) in accordance with the color measurement method as illustrated in FIG. 5. As a result, colorimetric values L*a*b*(15°), L*a*b*(45°), and L*a*b*(110°) are obtained for each color patch.

On the basis of these values, a color conversion model with which color values (L*, a*, and b*) are obtained from input values C, M, Y, K, Si, and θ (color measurement direction) is created.

Specifically, colors reproduced by using various combinations of C, M, Y, K, Si, and θ values are measured to obtain L*, a*, and b* values in advance to thereby obtain plural sets of values (C, M, Y, K, Si, and θ) and values (L*, a*, and b*). These sets are used to obtain a functional relation expressed by (L*, a*, b*)=f(C, M, Y, K, Si, θ), which is used as the color conversion model. When the color conversion model is used, and the toner amounts C, M, Y, K, and Si of the respective colors and the color measurement direction θ are provided, it is possible to obtain predicted color values L*, a*, and b*. As the function used for this color conversion model, a function typically used as a color conversion model, such as multiple regression, a neural network, or interpolation using a direct look-up table, may be used.

Accordingly, the color conversion model expressed by the function (L*, a*, b*)=f(C, M, Y, K, Si, θ) is created, and the created conversion model is stored in the color conversion model storage unit 36.

Figure 8:
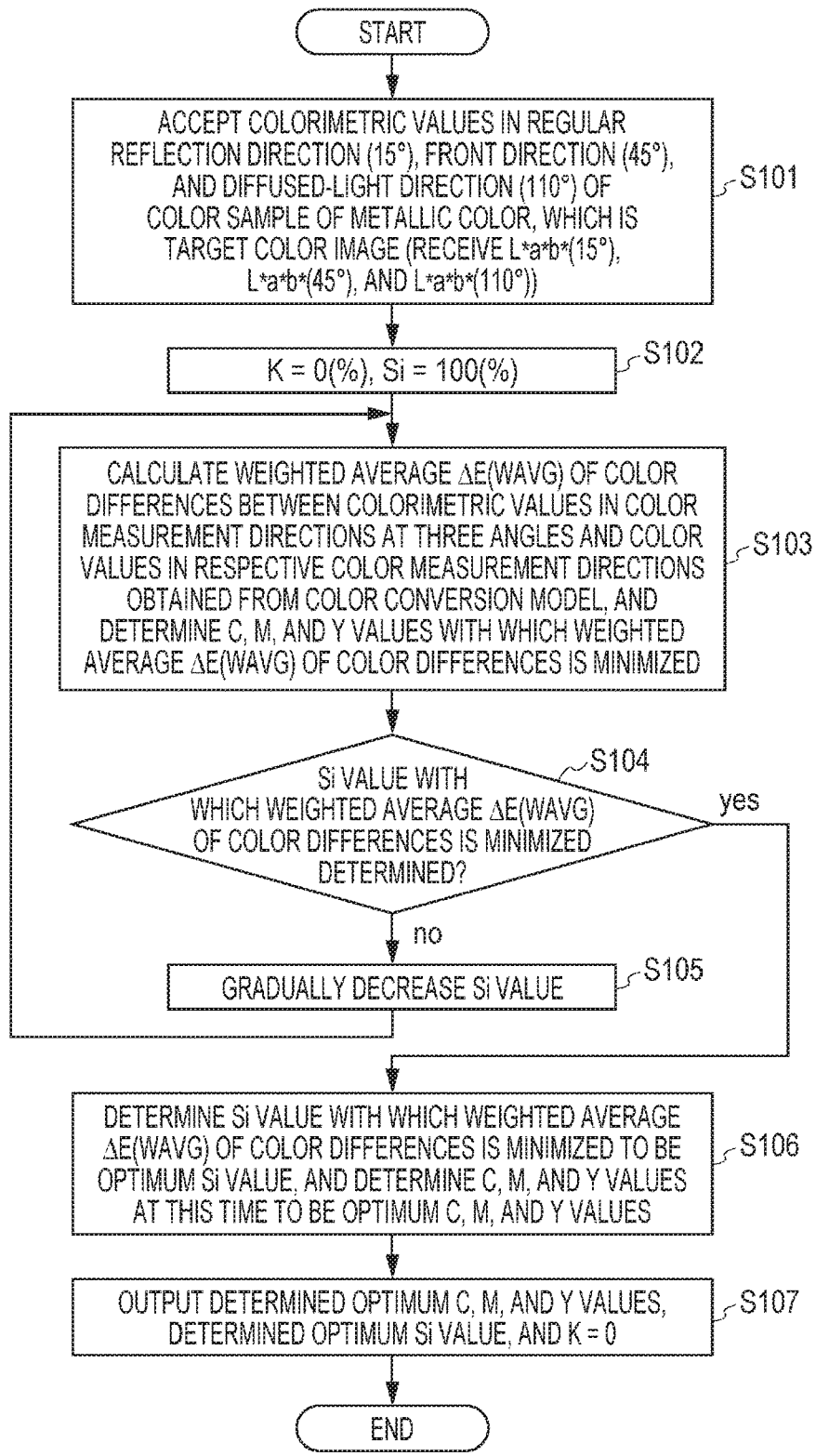
FIG. 8 is a flowchart for describing an operation of a color conversion apparatus in the image forming apparatus according to an exemplary embodiment of the present invention.

Now, an operation of the color conversion apparatus 40 in the image forming apparatus 10 according to this exemplary embodiment is described with reference to the flowchart illustrated in FIG. 8.

First, the colorimetric-value accepting unit 34 accepts colorimetric values (L*a*b*(15°), L*a*b*(45°), and L*a*b*(110°)) of a color sample of a metallic color, which is a target color image, respectively obtained in the regular reflection direction (15°), the front direction (45°), and the diffused-light direction (110°) (step S101).

Next, the conversion unit 35 first sets the K value to 0(%) and the Si value to 100(%) (step S102).

Subsequently, the conversion unit 35 determines a combination of the amounts of coloring materials with which the average of the color differences between the colorimetric values of the target color image obtained in the respective color measurement directions at three angles and color values in the respective color measurement directions obtained from the color conversion model is minimized (step S103).

Specifically, the conversion unit 35 calculates the weighted average $\Delta E(WAVG)$ of the color differences between the colorimetric values of the target color image obtained in the respective color measurement directions at three angles and color values in the respective color measurement directions obtained from the color conversion model, and determines C, M, and Y values with which the weighted average $\Delta E(WAVG)$ of the color differences is minimized.

A specific example of the weighted average of the color differences is described with reference to FIG. 9. As illustrated in FIG. 9, the weighted average is calculated by using the following expression.

Weighted average $\Delta E(WAVG)$ of color differences in respective color measurement directions={w1×(color difference between L*a*b*(15°) and f(C, M, Y, 0, Si, 15))+w2×(color difference between L*a*b*(45°) and f(C, M, Y, 0, Si, 45))+w3×(color difference between L*a*b*(110°) and f(C, M, Y, 0, Si, 110))}/(w1+w2+w3)

Here, w1, w2, and w3 are respectively a weighted coefficient in the regular reflection direction (15°), a weighted coefficient in the front direction (45°), and a weighted coefficient in the diffused-light direction (110°) and usually set to the same values.

For example, in a case of processing color differences in the respective color measurement directions with the same weights, the weighted coefficients need to be set so as to satisfy w1=w2=w3=1. In this case, the weighted average $\Delta E(WAVG)$ of the color differences becomes a simple average.

In a case of adjusting the metallic appearance of an output image, w1, w2, and w3 need to be changed. For example, when w1 is set to a weighted coefficient larger than w2 and w3, C, M, and Y values are determined such that the color difference in the regular reflection direction (15°) is further reduced to thereby obtain an image having a more metallic appearance.

The color difference ΔE(PQ) between a color value P=($L_1^*$, $a_1^*$, $b_1^*$) and a color value Q=($L_2^*$, $a_2^*$, $b_2^*$) is calculated by using the following expression.

$$\Delta E(PQ)=((L_1^*-L_2^*)^2+(a_1^*-a_2^*)^2+(b_1^*-b_2^*)^2)^{1/2}$$

Subsequently, the conversion unit 35 calculates C, M, and Y values with which the weighted average ΔE(WAVG) of the color differences is minimized. Here, as a specific method used by the conversion unit 35 to calculate C, M, and Y values with which the weighted average ΔE(WAVG) of the color differences is minimized, a general method for addressing an optimization problem by applying a numerical solution for a nonlinear equation, such as the simplex method or the Newton's method, may be used.

If an Si value with which the weighted average ΔE(WAVG) of the color differences is minimized is determined (yes in step S104), the flow proceeds to step S106. However, at this point in time, such an Si value is not determined (no in step S104), and therefore, the conversion unit 35 gradually decreases the Si value to, for example, 99%, 98%, 97%, and so on (step S105).

Subsequently, the conversion unit 35 performs the process in step S103 again and repeats the process until an Si value with which the weighted average ΔE(WAVG) of the color differences is minimized is determined. If an Si value with which the weighted average ΔE(WAVG) of the color differences is minimized is determined (yes in step S104), the conversion unit 35 determines the Si value to be an optimum Si value (step S106).

The method for determining the optimum Si value is described with reference to FIG. 10.

Figure 10:
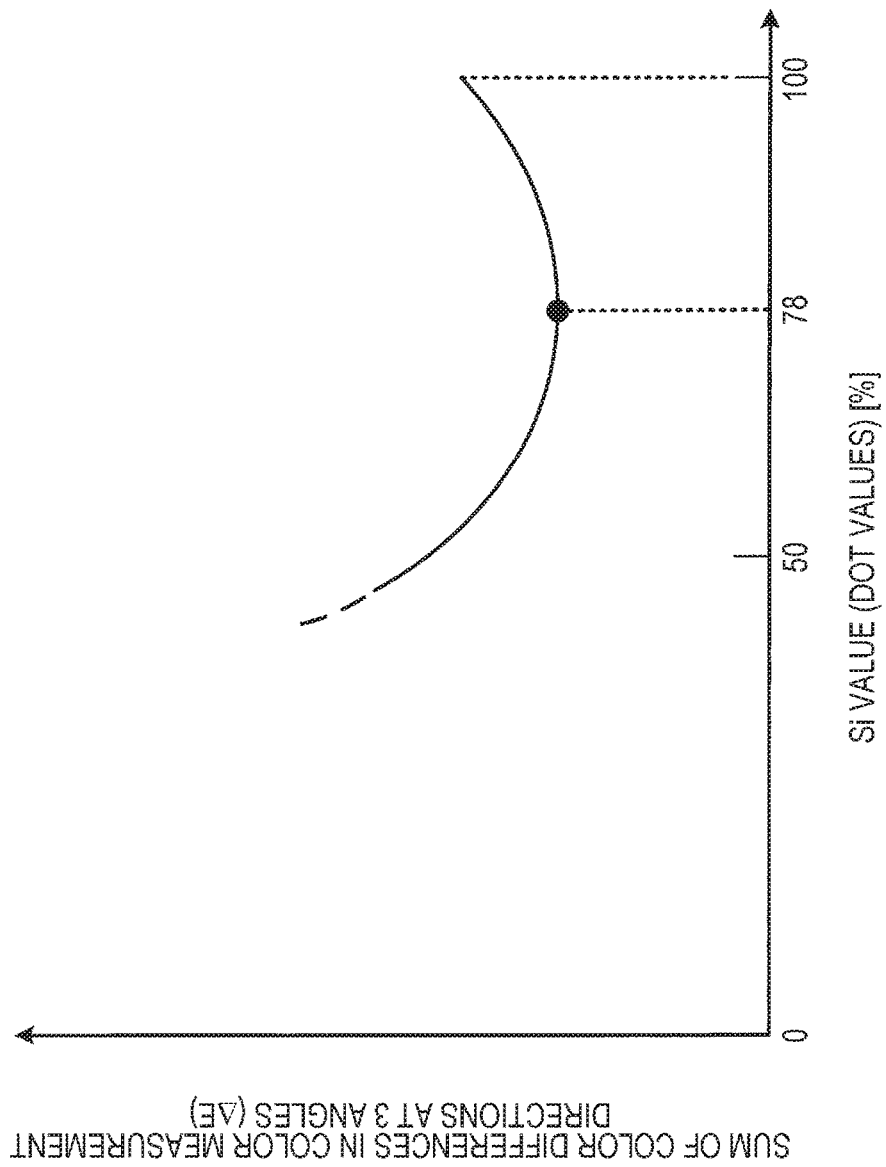
FIG. 10 is a diagram for describing a method for determining an optimum Si value.

It is assumed that, when the weighted average ΔE(WAVG) of the color differences in the color measurement directions at three angles is calculated while gradually decreasing the Si value from 100% as described above, the weighted average ΔE(WAVG) of the color differences changes as illustrated in FIG. 10. In the case illustrated in FIG. 10, an Si value of 78% at which the weighted average ΔE(WAVG) of the color differences is minimized is the optimum Si value.

Subsequently, the conversion unit 35 determines C, M, and Y values when the optimum Si value is obtained to be optimum C, M, and Y values (step S106). That is, the conversion unit 35 calculates the minimum value of the weighted average of the color differences in a case of changing the toner amounts of C, M, and Y toners other than an Si toner without changing the toner amount of the Si toner for respective different toner amounts of the Si toner sequentially to thereby determine the optimum Si value with which the minimum value of the weighted average of the color differences is minimized and determine the toner amounts of C, M, and Y toners when the optimum Si value is determined. Accordingly, the conversion unit 35 determines a combination of the toner amounts with which the weighted average of the color differences is minimized.

The conversion unit 35 last outputs the optimum C, M, and Y values, the optimum Si value, and K=0(%) to the controller 32 as the toner amounts C, M, Y, K, and Si for the measured color sample image of a metallic color (step S107).

As described above, the conversion unit 35 first calculates the weighted average ΔE(WAVG) of the color differences in the case of changing the toner amounts of color toners (C, M, and Y toners) other than an Si toner without changing the toner amount of the Si toner for respective different toner amounts of the Si toner sequentially to thereby determine a toner amount of the Si toner with which the minimum value of the weighted average ΔE(WAVG) of the color differences is minimized and determine the toner amounts of toners other than the Si toner when the toner amount of the Si toner is determined. Accordingly, the conversion unit 35 determines a combination of the toner amounts with which the average of the color differences is minimized.

Now, the reason why the color conversion apparatus 40 according to this exemplary embodiment uses colorimetric values measured in the color measurement directions at three angles (15°, 45°, and 110°) to determine the toner amounts of C, M, Y, K, and Si toners for reproducing a color sample image of a metallic color is described below.

Figure 11:
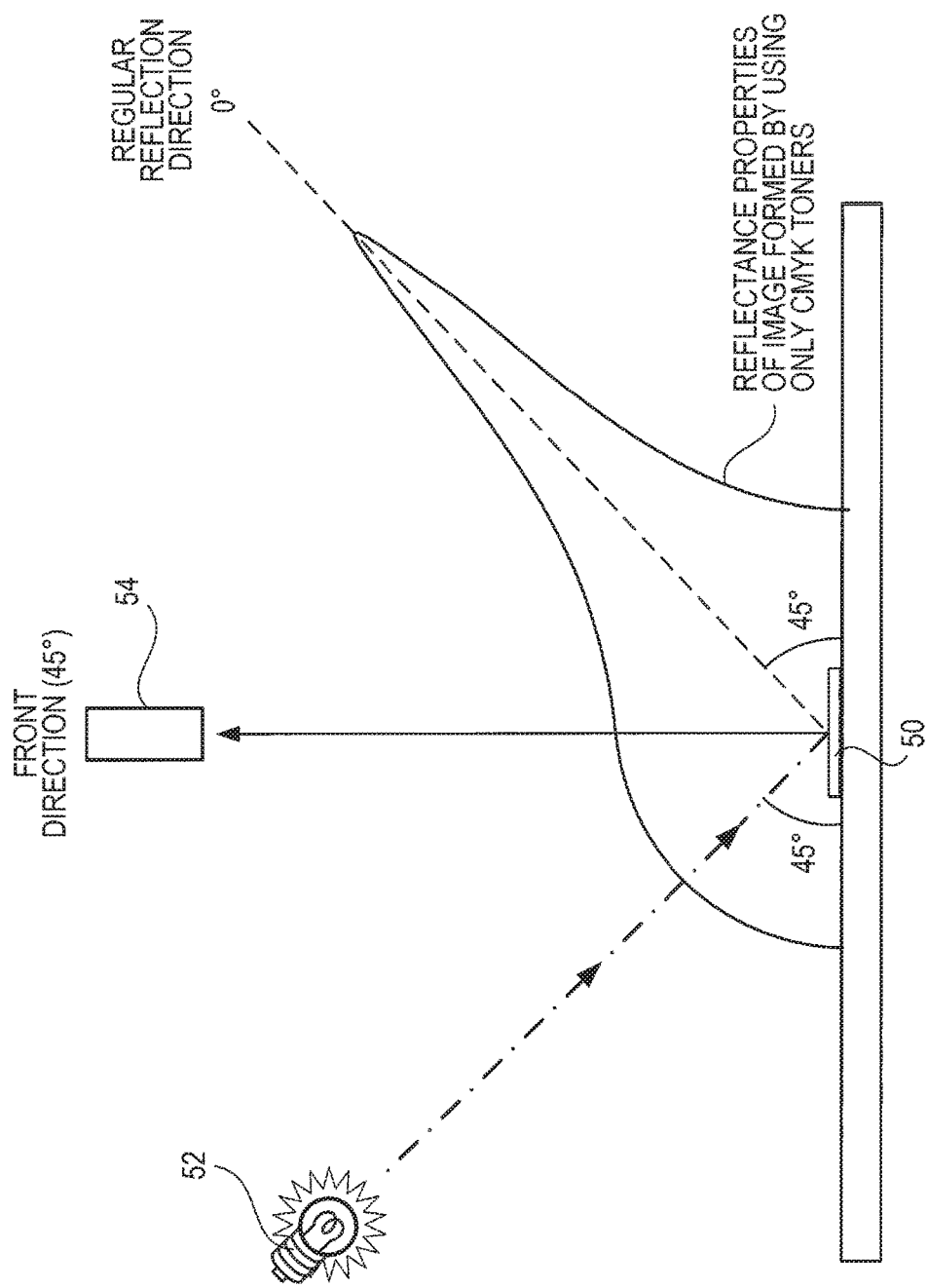
FIG. 11 is a diagram for describing a color measurement method for an ordinary image using only C, M, Y, and K toners.

First, a color measurement method for an ordinary image formed by using only C, M, Y, and K toners is described with reference to FIG. 11. The reflectance properties of an ordinary image formed by using only C, M, Y, and K toners without a metallic-color toner are as illustrated in FIG. 11. It is found from FIG. 11 that the amount of light in a regular reflection direction is larger than the amount of light in the other directions and that the amounts of light of diffused light in the directions other than the regular reflection direction are substantially the same. Therefore, in an ordinary color measurement method, illumination light is emitted from the light source 52 to the measurement target image 50 in a diagonal direction, and color values in the front direction (45°) is measured by the colorimeter 54.

In a case where a color measurement of a color sample of a metallic color is performed by using such an ordinary color measurement method, the toner amounts of C, M, Y, K, and Si toners are determined on the basis of colorimetric values, and the color sample image is reproduced, an issue arises, which is described below with reference to FIG. 12.

Figure 12:
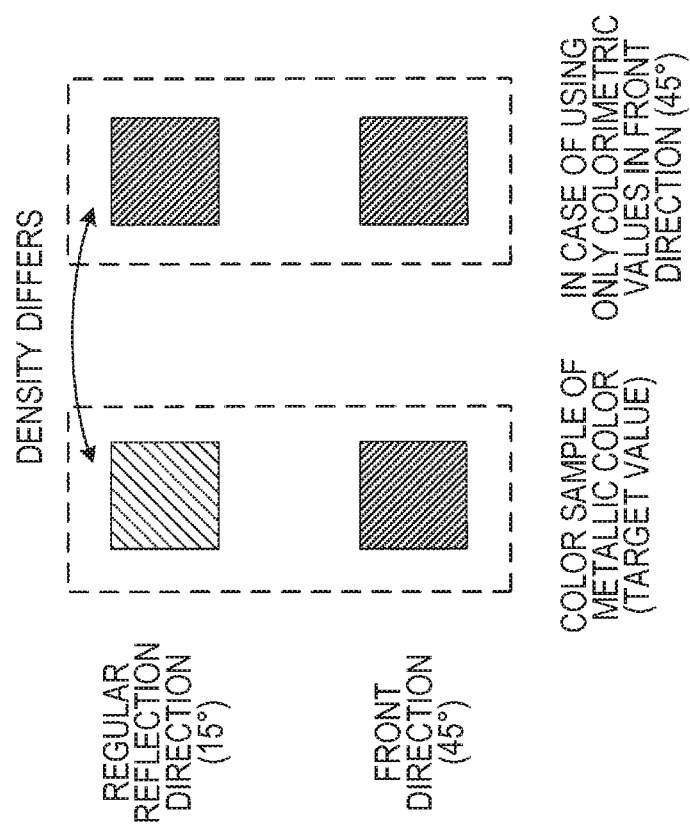
FIG. 12 is a diagram for describing an issue that arises in a case of reproducing a color sample image of a metallic color by using only colorimetric values in a front direction (45°)

In a case where a color sample of a metallic color is reproduced by using only colorimetric values in the front direction (45°), as illustrated in FIG. 12, it is possible to make the reproduced color tone observed in the front direction (45°) close to the actual color tone. However, the reproduced color tone observed in, for example, the regular reflection direction at 15° may be significantly different from the actual color tone. It is found from the example illustrated in FIG. 12 that, in the case of viewing in the regular reflection direction at 15°, the reproduced image printed by using C, M, Y, K, and Si toners has a density higher than that of the actual color sample of a metallic color, resulting in different density states.

In a usual environment, light beams are emitted from various directions to an observation target and reflected, and a person views such various reflected light beams to determine the color of the object. Therefore, regarding, for example, an image of a metallic color for which the color significantly changes depending on the direction in which the image is viewed, if only a color viewed in a specific direction is reproduced, the color tone observed in another direction may significantly differ from the color tone of the actual image, and the color tone observed in actual lighting might also differ.

Figure 13:
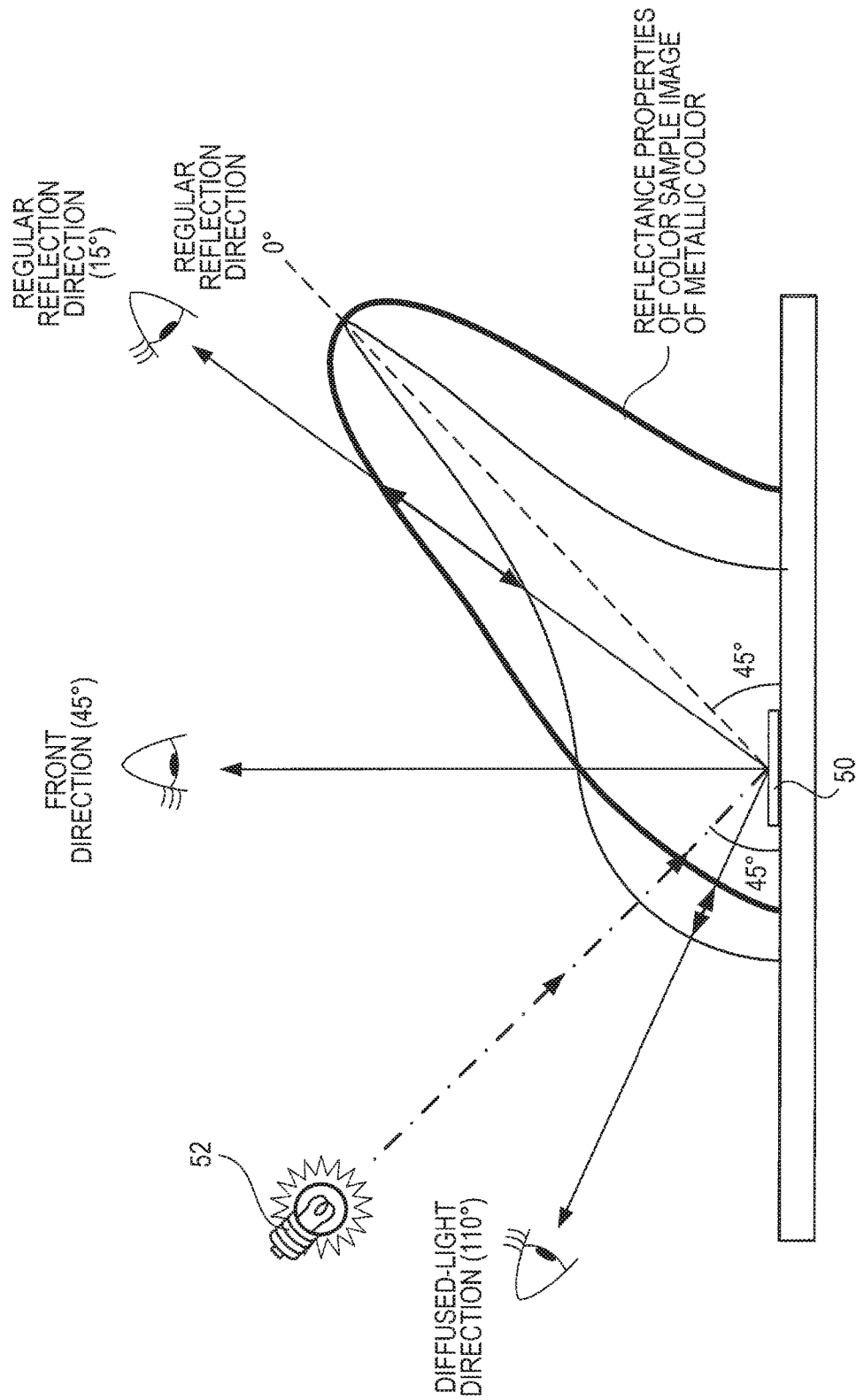
FIG. 13 is a diagram for describing a difference in reflectance properties between a CMYK toner image and a color sample image of a metallic color.

Now, a difference in reflectance properties between a CMYK toner image and a color sample image of a metallic color is described with reference to FIG. 13.

Regarding a color sample image of a metallic color and a CMYK toner image, the lightness of a color sample image of a metallic color is higher than that of a CMYK toner image in the regular reflection direction (15°) and lower than that of a CMYK toner image in the diffused-light direction (110°).

Therefore, in the color conversion apparatus 40 according to this exemplary embodiment, colorimetric values obtained in the regular reflection direction (15°) and the diffused-light direction (110°) in addition to colorimetric values obtained in the front direction (45°) are used to determine the values of C, M, Y, K, and Si toner amounts with which the average of color differences in the respective color measurement directions is minimized to thereby reproduce an image that is close to the color sample image even if the image is viewed in any direction.

Figure 14:
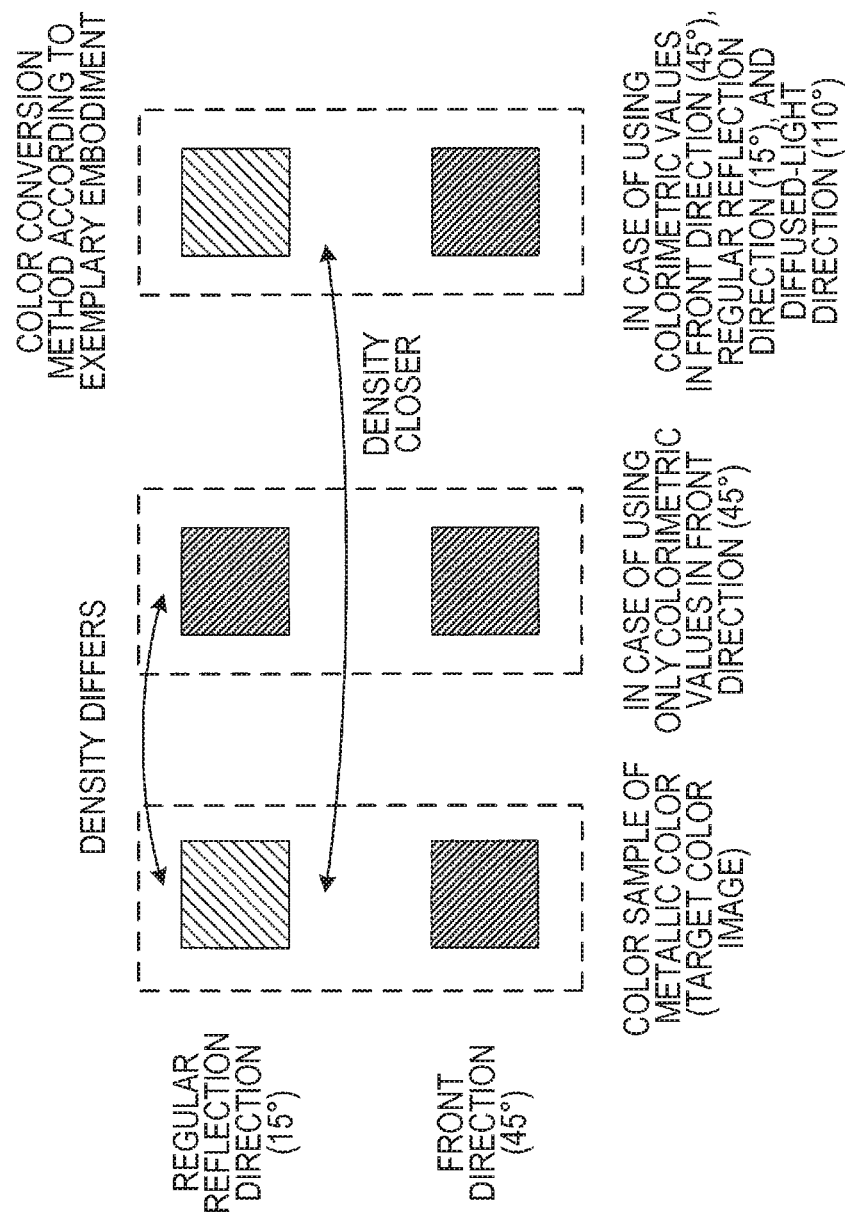
FIG. 14 is a diagram illustrating an example image that is printed by determining the toner amounts in accordance with a color conversion method according to an exemplary embodiment of the present invention so as to reproduce a color sample image of a metallic color.

FIG. 14 illustrates an example printed image that is reproduced by the image forming apparatus 10 according to this exemplary embodiment reproducing a color sample image of a metallic color, the image forming apparatus 10 determining the toner amounts in accordance with the above-described color conversion method.

It is found from FIG. 14 that, in the case where an image is printed by using C, M, Y, K, and Si toners for which the toner amounts are determined in accordance with the color conversion method according to this exemplary embodiment, the color tone observed in the regular reflection direction (15°) as well as the color tone observed in the front direction (45°) is close to that of the color sample image of the metallic color. Although not illustrated in FIG. 14, regarding the color tone observed in the diffused-light direction (110°), the lightness is slightly higher than that of the color sample image. However, the toner amounts are determined by reflecting a color difference in the diffused-light direction (110°), and therefore, it is possible to make the density observed in the regular reflection direction (15°) close to that of the color sample image without making a color difference in the diffused-light direction (110°) so large.

Figure 15:
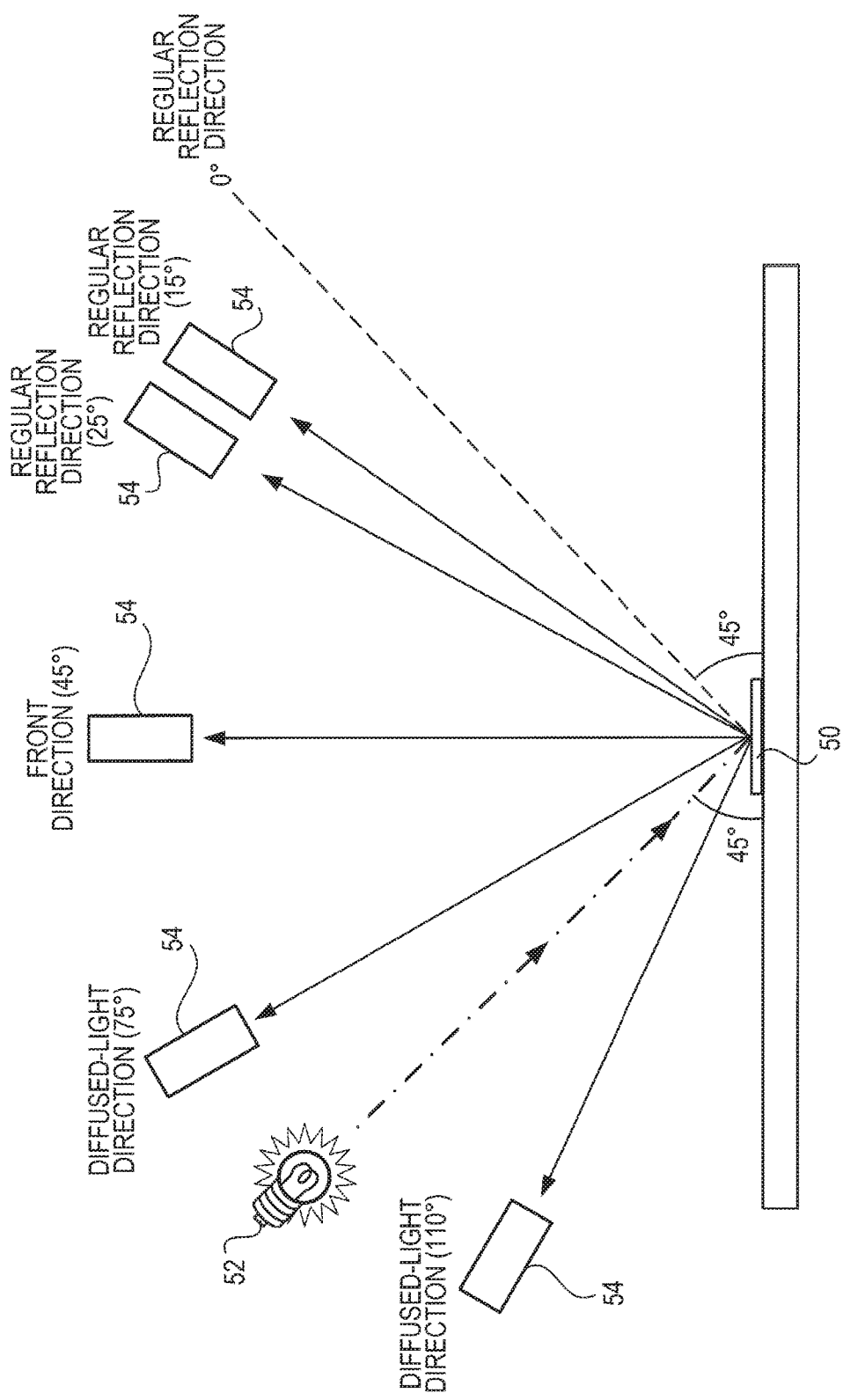
FIG. 15 is a diagram for describing a case where a color measurement is performed in color measurement directions at five angles.

In the description given above, the case has been described where the toner amounts of the respective color toners including a silver toner are calculated by using colorimetric values obtained in the color measurement directions at three angles, namely, the regular reflection direction (15°), the front direction (45°), and the diffused-light direction (110°). However, the toner amounts may be calculated by using colorimetric values obtained in color measurement directions at multiple angles, such as four angles or five angles, more than three angles. FIG. 15 illustrates an example case where a color measurement of the measurement target image 50 is performed in color measurement directions at five angles, namely, the regular reflection direction (15°), a regular reflection direction (25°), the front direction (45°), a diffused-light direction (75°), and the diffused-light direction (110°).

When colorimetric values in the color measurement directions at five angles obtained in accordance with the color measurement method as illustrated in FIG. 15 are used, it is possible to calculate the toner amounts of the respective color toners including a silver toner by using a method similar to the method described above.

That is, the conversion unit 35 may calculate the toner amounts of the respective color toners by using colorimetric values of the target color image measured in the direction (25°) closer to the regular reflection direction (15°) than to the front direction (45°) and colorimetric values of the target color image measured in the diffused-light direction (75°) between the front direction (45°) and the illumination direction of the light source 52 in addition to colorimetric values measured in the regular reflection direction (15°), the front direction (45°), and the diffused-light direction (110°). Further, it is possible to use colorimetric values measured in a color measurement direction other than the color measurement directions illustrated in FIG. 15.

As the number of colorimetric values used to calculate the toner amounts increases, it is possible to make the color tone observed in actual lighting closer to that of the color sample image.

Modification

In the description given above, the case has been described where the exemplary embodiment is applied to an image forming apparatus that performs printing by using a metallic (metallic gloss color) toner, such as a silver toner or a gold toner; however, the exemplary embodiment of the present invention is not limited to this case. The exemplary embodiment of the present invention is also applicable to a case where printing is performed by using a luster coloring material, such as a pearly coloring material other than toners, which produces a color tone that changes depending on the viewing direction.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color conversion apparatus comprising:
at least one processor configured to execute:
an accepting unit configured to accept a plurality of colorimetric values obtained by measuring a target color image in a plurality of directions; and
a converter configured to determine, for each direction from among the plurality of directions, a color difference between the corresponding colorimetric value and a colorimetric value obtained from a color conversion model,
wherein the converter is further configured to convert, based on the determined color differences, the plurality of colorimetric values accepted by the accepting unit to color values including a value indicating a coloring-material amount of a luster coloring material and a value indicating a coloring-material amount of a coloring material other than the luster coloring material.

2. The color conversion apparatus according to claim 1, wherein
the plurality of colorimetric values include a colorimetric value of the target color image measured in a front direction, which is a direction normal to the target color image, and a colorimetric value of the target color image measured in a regular reflection direction relative to illumination light in a case of illuminating the target color image with light in a diagonal direction.

3. The color conversion apparatus according to claim 2, wherein
the plurality of colorimetric values further include a colorimetric value of the target color image measured in a diffused-light direction on a side close to an entry direction of the illumination light relative to the front direction.

4. The color conversion apparatus according to claim 2, wherein the plurality of colorimetric values further include a colorimetric value of the target color image measured in a direction closer to the regular reflection direction than to the front direction.

5. The color conversion apparatus according to claim 3, wherein
the plurality of colorimetric values further include a colorimetric value of the target color image measured in a direction closer to the regular reflection direction than to the front direction.

6. The color conversion apparatus according to claim 1, further comprising:
a memory configured to store the color conversion model in which combinations of color measurement directions and coloring-material amounts of coloring materials of respective colors are associated with color values that are actually measured,
wherein the converter determines a combination of coloring-material amounts with which an average of the color differences is minimized.

7. The color conversion apparatus according to claim 2, further comprising:
a memory configured to store the color conversion model in which combinations of color measurement directions and coloring-material amounts of coloring materials of respective colors are associated with color values that are actually measured,
wherein the converter determines a combination of coloring-material amounts with which an average of the color differences is minimized.

8. The color conversion apparatus according to claim 3, further comprising:
a memory configured to store the color conversion model in which combinations of color measurement directions and coloring-material amounts of coloring materials of respective colors are associated with color values that are actually measured,
wherein the converter determines a combination of coloring-material amounts with which an average of the color differences is minimized.

9. The color conversion apparatus according to claim 4, further comprising:
a memory configured to store the color conversion model in which combinations of color measurement directions and coloring-material amounts of coloring materials of respective colors are associated with color values that are actually measured, wherein
the converter determines a combination of coloring-material amounts with which an average of the color differences is minimized.

10. The color conversion apparatus according to claim 5, further comprising:
a memory configured to store the color conversion model in which combinations of color measurement directions and coloring-material amounts of coloring materials of respective colors are associated with color values that are actually measured,
wherein the converter determines a combination of coloring-material amounts with which an average of the color differences is minimized.

11. The color conversion apparatus according to claim 6, wherein
the converter calculates the average of the color differences in a case of changing the coloring-material amount of the coloring material other than the luster coloring material without changing the coloring-material amount of the luster coloring material for respective different coloring-material amounts of the luster coloring material sequentially to thereby determine a coloring-material amount of the luster coloring material with which a minimum value of the average of the color differences is minimized, determine the coloring-material amount of the coloring material other than the luster coloring material when the coloring-material amount of the luster coloring material is determined, and determine a combination of the coloring-material amounts with which the average of the color differences is minimized.

12. The color conversion apparatus according to claim 7, wherein
the converter calculates the average of the color differences in a case of changing the coloring-material amount of the coloring material other than the luster coloring material without changing the coloring-material amount of the luster coloring material for respective different coloring-material amounts of the luster coloring material sequentially to thereby determine a coloring-material amount of the luster coloring material with which a minimum value of the average of the color differences is minimized, determine the coloring-material amount of the coloring material other than the luster coloring material when the coloring-material amount of the luster coloring material is determined, and determine a combination of the coloring-material amounts with which the average of the color differences is minimized.

13. The color conversion apparatus according to claim 8, wherein
the converter calculates the average of the color differences in a case of changing the coloring-material amount of the coloring material other than the luster coloring material without changing the coloring-material amount of the luster coloring material for respective different coloring-material amounts of the luster coloring material sequentially to thereby determine a coloring-material amount of the luster coloring material with which a minimum value of the average of the color differences is minimized, determine the coloring-material amount of the coloring material other than the luster coloring material when the coloring-material amount of the luster coloring material is determined, and determine a combination of the coloring-material amounts with which the average of the color differences is minimized.

14. The color conversion apparatus according to claim 9, wherein
the converter calculates the average of the color differences in a case of changing the coloring-material amount of the coloring material other than the luster coloring material without changing the coloring-material amount of the luster coloring material for respective different coloring-material amounts of the luster coloring material sequentially to thereby determine a coloring-material amount of the luster coloring material with which a minimum value of the average of the color differences is minimized, determine the coloring-material amount of the coloring material other than the luster coloring material when the coloring-material amount of the luster coloring material is determined, and determine a combination of the coloring-material amounts with which the average of the color differences is minimized.

15. The color conversion apparatus according to claim 10, wherein the converter calculates the average of the color differences in a case of changing the coloring-material amount of the coloring material other than the luster coloring material without changing the coloring-material amount of the luster coloring material for respective different coloring-material amounts of the luster coloring material sequentially to thereby determine a coloring-material amount of the luster coloring material with which a minimum value of the average of the color differences is minimized, determine the coloring-material amount of the coloring material other than the luster coloring material when the coloring-material amount of the luster coloring material is determined, and determine a combination of the coloring-material amounts with which the average of the color differences is minimized.

16. The color conversion apparatus according to claim 1, wherein
the luster coloring material is a metallic gloss color toner.

17. An image forming apparatus comprising:
at least one processor configured to execute:
an accepting unit configured to accept a plurality of colorimetric values obtained by measuring a target color image in a plurality of directions;
a converter configured to determine, for each direction from among the plurality of directions, a color difference between the corresponding colorimetric value and a colorimetric value obtained from a color conversion model,
wherein the converter is further configured to convert, based on the determined color differences, the plurality of colorimetric values accepted by the accepting unit to color values including a value indicating a coloring-material amount of a luster coloring material and a value indicating a coloring-material amount of a coloring material other than the luster coloring material; and
an output unit configured to output an image on the basis of the color values obtained as a result of conversion by the converter.

18. A non-transitory computer readable medium storing a program causing a computer to execute a process for color conversion, the process comprising:
accepting a plurality of colorimetric values obtained by measuring a target color image in a plurality of directions;
determining, for each direction from among the plurality of directions, a color difference between the corresponding colorimetric value and a colorimetric value obtained from a color conversion model; and
converting, based on the determined color differences, the plurality of colorimetric values accepted in the accepting to color values including a value indicating a coloring-material amount of a luster coloring material and a value indicating a coloring-material amount of a coloring material other than the luster coloring material.

* * * * *